Jan. 3, 1967 H. FINZEL 3,295,898
BEARING CARTRIDGE AND SEALING UNIT FOR A PUMP SHAFT
Filed Oct. 1, 1964 2 Sheets-Sheet 1

INVENTOR.
HERMAN FINZEL
BY Edward C. Shredy
HIS ATTORNEY

Jan. 3, 1967   H. FINZEL   3,295,898
BEARING CARTRIDGE AND SEALING UNIT FOR A PUMP SHAFT
Filed Oct. 1, 1964   2 Sheets-Sheet 2

INVENTOR.
HERMAN FINZEL
BY Edward C. Shriy
HIS ATTORNEY.

United States Patent Office 3,295,898
Patented Jan. 3, 1967

3,295,898
BEARING CARTRIDGE AND SEALING UNIT FOR A PUMP SHAFT
Herman Finzel, Chicago, Ill., assignor to Weil Pump Company, Chicago, Ill., a corporation of Illinois
Filed Oct. 1, 1964, Ser. No. 400,839
4 Claims. (Cl. 308—189)

My invention relates to a bearing cartridge and sealing unit for a pump shaft and has for one of its principal objects the provision of an improved construction of this character which will be highly efficient in use and economical in manufacture.

Among the salient objects of the invention is the provision for enabling one to repair, renew, or replace a bearing cartridge and inner seal unit of a shaft of a pump or the like without separating the split casing sections of the pump. To replace a bearing cartridge or the inner seal unit in pumps such as impeller pumps, sump pumps and the like, which are now presently in use, the general practice is to separate the complementary housing or casing sections of the pump to expose such cartridge and seal unit and then resort to a bearing puller to remove the bearing cartridge. Such procedure is not only laborious but also expensive and requires the use of a bearing puller to remove the bearing cartridge and generally results in damage to the cartridge. It also requires replacement of the seal between the sections of the pump housing or casing, the original seal having been broken when the two sections of the pump housing are separated for the purposes herein stated.

An object of this invention is to eliminate the foregoing objectionable features and to provide an arrangement whereby the bearing cartridge and the seal unit may be removed for replacement or repair without disturbing or separating the complementary sections of the housing or casing of the pump and without damage to the bearing cartridge.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
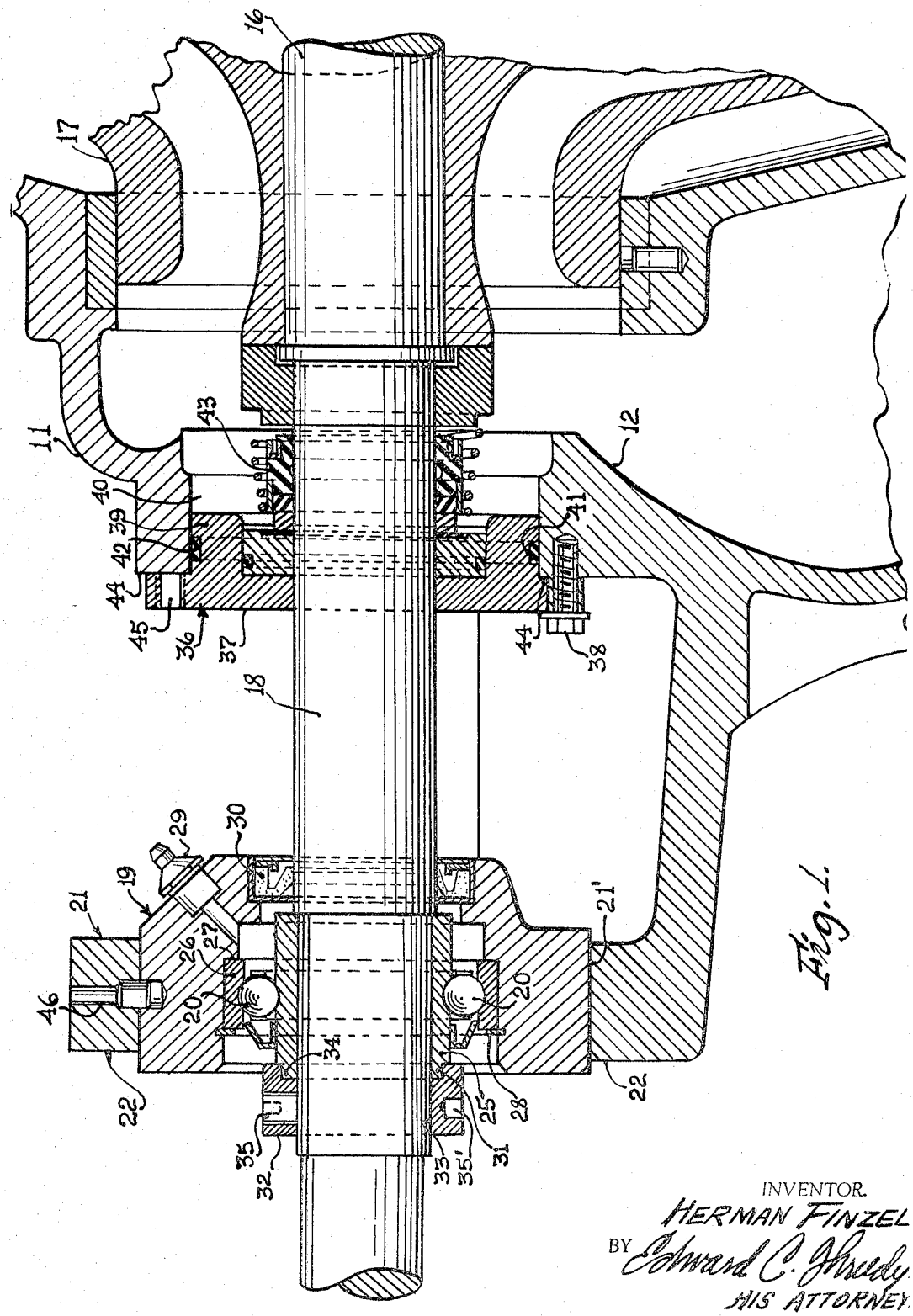
FIG. 1 is a fragmentary vertical sectional detail view of the invention taken substantially on line 1—1 of FIG. 2.
Figure 2:
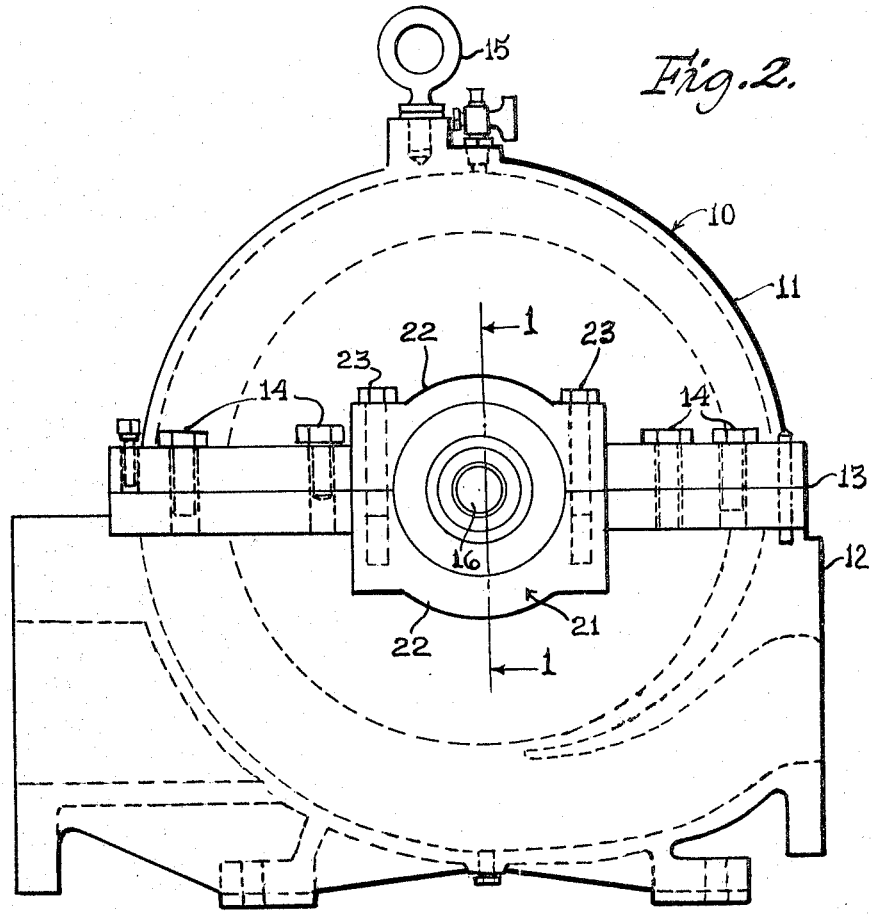
FIG. 2 is an end elevational view of the pump embodying my invention.
Figure 3:
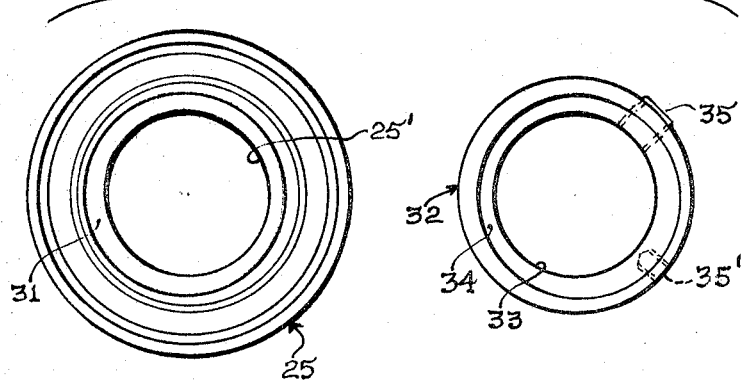
FIG. 3 is an exploded elevational view of the confronting surfaces of a bearing race and eccentric locking ring embodied in my invention.

The several objects of this invention are accomplished by the preferred form of construction shown in the accompanying drawings wherein a pump is indicated at 10 (FIG. 1). The pump 10 comprises complementary sections 11 and 12, split horizontally as at 13 and connected together by means of bolts 14 with a suitable seal therebetween. Where the pump is relatively large, the section 11 is provided with an eye bolt 15 to which a suitable lifting chain (not shown) may be attached for the purposes of lifting the section 11 from position upon the section 12 after the bolts 14 have been removed. This operation results in breaking the seal.

Within the pump 10 is arranged a shaft 16 driven by a suitable motor (not shown). In the present instance such shaft 16 carries an impeller 17 which is rotated with the shaft. The opposite end portions 18 of the shaft 16 are supported by bearing cartridges of identical construction. Such opposite end portions are also sealed by identical seal units hereinafter described.

The bearing cartridge is indicated at 19 and includes a conventional inner bearing race 25 and a conventional outer bearing race 26 for the ball bearings 20. The bearing cartridge 19 is positioned in and supported by an arm 21. The arm 21 is of a split construction providing an opening 21' and comprises complementary sections 22 which are connected together by means of bolts 23. One of such sections 22 preferably constitutes an integral portion of the section 12.

The outer bearing race 26 is removably mounted between a shoulder 27 of the cartridge 19 and a split snap ring 28. The end portion 18 of the shaft 16 is journalled in the bearing cartridge 19 and extends through the inner bearing race 25, which is slip-fitted to the shaft. Extending around the end portion 18 of the shaft 16 at the inner side of the bearing cartridge 19 is a suitable seal 30 which prevents moisture, contaminants, or other foreign matter from gaining access into the bearing cartridge and retains bearing grease within the cartridge as it is fed thereto through a suitable grease cap 29.

The bore 25' through the race 25, is eccentric with respect thereto. As shown, the outer end of the race 25 provides a reduced integral shoulder 31. A locking ring is indicated at 32 which has a concentric bore 33 through which the end portion 18 of the shaft 16 is journalled.

The locking ring 32 provides an inner recess 34, the bore of which is eccentric with respect to the bore 33. The recess 34 receives the shoulder 31 (FIG. 1). By rotating the locking ring 32 in one direction relative to the shoulder 31, the ring 32 will be wedged against the shaft portion 18 and be thus self-secured upon the shaft portion 18 and thereby in turn securely hold the cartridge 19 on the shaft portion 18. If desired, the locking ring 32 may also be secured in wedged position upon the shaft portion 18 by a set screw 35. However, I have found by practical experience that such screw is not essentially necessary.

In FIG. 1 an inner seal unit 36 is illustrated. This unit includes a face plate 37 having an outside diameter which permits the free passage of the face plate through the opening 21' of the arm 21. Such face plate 37 is removably secured to the sections 11 and 12 of the pump housing by bolts 38. The face plate 37 provides a reduced inner portion 39 which fits into a bore 40 formed in the sections 11 and 12. An annular recess 41 is formed in such reduced portion 39 for the positioning therein of an O ring 42. The inner seal construction preferably includes a sealing assembly 43 comprising a combination of sealing elements embracing the shaft portion 18 and effectively preventing water, contaminants and other foreign matter from leaking out of the pump housing or casing along the shaft 16–18.

Should the packing assembly become worn and require replacement, after removal of the bearing assembly 19 in the manner to be presently stated, it is only necessary to remove the bolts 38 and separate the face plate 37 from contact with the adjacent surfaces 44 of the sections 11 and 12. To facilitate the separation of the face plate 37 from such surfaces, I provide a tapped opening 45 into which may be threaded a jack screw which, when threaded to bear against the surface 44, will cause the face plate 37 to be moved from contact therewith and break the seal between the face plate 37 and such surface. Any one of the bolts 38 may be utilized as the jack screw for the purposes above stated.

As hereinbefore stated, it has been the custom in the art to remove the bearing cartridge from the shaft by means of a bearing puller. It is obvious that utilizing such a puller results in damage to the bearing, with the result that the bearing has to be replaced. By the construction herein-before described, no such bearing puller is required to remove the bearing cartridge 19.

As before stated, the inner bearing race 25 has slip-fit connection with the end portion 18 of the shaft 16. To remove the bearing cartridge 19, all that is necessary to do is to rotate the locking ring 32 from its wedging engagement with the end portion 18 of the shaft. When this has been accomplished, the locking ring 32 may be removed from the shaft portion 18 and, as the inner bearing race 25 has slip connection with the shaft portion 18, the bearing cartridge 19 may be manually removed without the use of any tools after the complementary sections 22 have been separated.

As stated above, the innerface plate 37 of the seal unit 36 has an outside diameter less than the diameter of the opening 21'. Consequently, should it be found necessary to remove the inner seal unit 36, the face plate 37 thereof may be separated from the adjacent surfaces of the sections 11 and 12 by threading into the opening 45 one of the jack bolts 38. Upon such separation, the entire unit 36 may be removed from the shaft through that part of the opening 21' of the arm section 21.

To rotate the locking ring 32 from wedging engagement with the shaft portion 18, a conventional spanner wrench may be used, one end portion of the wrench engaging in a socket 35' formed in such ring.

To complete the invention, a dowel pin 46 is positioned in the manner shown in FIG. 1 to hold the bearing cartridge 19 within and against rotation relative to the supporting arm 21.

By using bearing cartridges 19 of identical construction on opposite end portions 18 of the shaft 16 and by adjusting the eccentric locking ring 32 with respect to the bearing race 25, the shaft 16 may be properly aligned between the cartridge 19, thereby reducing to a minimum, vibration and noise which would otherwise result from lack of proper alignment.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In combination with a pump housing and a shaft extending longitudinally therethrough,
   (a) sealing means provided by said housing for opposite end portions of the shaft,
   (b) each of said sealing means including a removable face plate connected to the housing,
   (c) said pump housing having oppositely disposed supporting arms spaced from said sealing means,
   (d) said arms each providing an opening,
   (e) identical bearing cartridges mounted in the openings of said arms,
   (f) each of said bearing cartridges including an inner race slip-fitted to said shaft for hand removal therefrom and a locking ring eccentrically engaging said race for removably securing the cartridge upon said shaft,
   (g) the diameter of said face plate of said sealing means being less than the diameter of the opening of said arm to permit said sealing means, when said face plate is detached from said pump housing, to pass freely through said opening of said arm upon removal of said cartridge from said shaft.

2. In combination with a pump housing and a shaft extending longitudinally therethrough,
   (a) sealing means provided by said housing for opposite end portions of the shaft,
   (b) each of said sealing means including a removable face plate connected to the housing,
   (c) said pump housing having oppositely disposed supporting arms spaced from said sealing means,
   (d) said arms each providing an opening,
   (e) identical bearing cartridge mounted in the openings of said arms,
   (f) each of said bearing cartridges including an inner race slip-fitted to said shaft for hand removal therefrom and a locking ring eccentrically engaging said race for removably securing the cartridge upon said shaft and for aligning said shaft longitudinally with respect to the long axis of said cartridge,
   (g) the diameter of said face plate being less than the diameter of the opening of said arm to permit said sealing means, when said face plate is detached from said pump housing, to pass freely through said opening of said arm upon removal of said cartridge from said shaft.

3. In combination with a pump housing and a shaft extending longitudinally therethrough,
   (a) sealing means provided by said housing for opposite end portions of the shaft,
   (b) each of said sealing means including a removable face plate connected to the housing,
   (c) said pump housing having oppositely disposed supporting arms spaced from said sealing means,
   (d) said arms each providing an opening,
   (e) identical bearing cartridges mounted in the openings of said arms,
   (f) each of said bearing cartridges including an inner race slip-fitted to said shaft for hand removal therefrom and eccentric means engaging said race for removably securing the cartridge upon said shaft,
   (g) the diameter of said face plate of said sealing means being less than the diameter of the opening of said arm to permit said sealing means, when said face plate is detached from said pump housing, to pass freely through said opening of said arm upon removal of said cartridge from said shaft.

4. In combination with a pump housing and a shaft extending longitudinally therethrough,
   (a) removable sealing means provided by said housing for opposite end portions of the shaft,
   (b) each of said sealing means including a face plate removably connected to the housing,
   (c) said pump housing having oppositely disposed supporting arms spaced from said sealing means,
   (d) said arms each providing an opening,
   (e) identical bearing cartridges mounted in the openings of said arms,
   (f) each of said bearing cartridges including an inner bearing race slip-fitted to said shaft and means engaging the race for securing the bearing cartridge upon said shaft,
   (g) the diameter of said face plate being less than the diameter of the opening of said arm to permit said sealing means, when said face plate is detached from said pump housing, to pass freely through said opening of said arm.

References Cited by the Examiner

UNITED STATES PATENTS

| | | | |
|---|---|---|---|
| 1,906,243 | 5/1933 | Banniger | 308—236 |
| 2,155,452 | 4/1939 | Stelzer | 103—104 |
| 2,273,379 | 2/1942 | Searles | 308—236 |

MARTIN P. SCHWADRON, *Primary Examiner.*

FRANK SUSKO, *Examiner.*